(12) United States Patent
Mizuno et al.

(10) Patent No.: US 7,184,191 B2
(45) Date of Patent: Feb. 27, 2007

(54) DISPLAY DEVICE

(75) Inventors: Yukitami Mizuno, Tokyo (JP);
Shintaro Enomoto, Kanagawa (JP);
Naru Ikeda, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/245,355

(22) Filed: Oct. 7, 2005

(65) Prior Publication Data

US 2006/0082588 A1     Apr. 20, 2006

(30) Foreign Application Priority Data

Oct. 15, 2004   (JP)  .............................. 2004-301402

(51) Int. Cl.
*G02F 1/153* (2006.01)
(52) U.S. Cl. ...................... 359/267; 359/275
(58) Field of Classification Search ............... 359/265, 359/266, 267, 268, 269, 270, 271, 272, 273, 359/274; 345/76, 77, 81, 85, 87, 88, 89, 345/90, 105, 107; 252/582, 583, 600
See application file for complete search history.

(56) References Cited

U.S. PATENT DOCUMENTS

| | | | |
|---|---|---|---|
| 6,734,305 B2 * | 5/2004 | Pierre et al. ................. | 544/347 |
| 6,791,737 B2 * | 9/2004 | Giron ........................ | 359/265 |
| 7,002,723 B2 * | 2/2006 | Enomoto et al. ........... | 359/273 |
| 2005/0062050 A1 | 3/2005 | Mizuno et al. | |

FOREIGN PATENT DOCUMENTS

| | | |
|---|---|---|
| JP | 9-138430 | 5/1997 |
| JP | 10-39344 | 2/1998 |
| JP | 2001-209333 | 8/2001 |
| JP | 2002-324401 | 11/2002 |
| JP | 2003-21848 | 1/2003 |
| JP | 2003-241188 | 8/2003 |

* cited by examiner

*Primary Examiner*—Ricky Mack
*Assistant Examiner*—Tuyen Tra
(74) *Attorney, Agent, or Firm*—Oblon, Spivak, McClelland, Maier & Neustadt, P.C.

(57) ABSTRACT

A display device with both light-emitting and reflective display capabilities is disclosed. This device includes first and second electrodes provided on a first substrate, a second substrate provided to be spaced apart from and oppose the first substrate, a third electrode provided on the second substrate, a first layer which is provided between the first and second substrates on the first substrate side and which contains a light emissive material that emits light through electrochemical oxidation or reduction, a second layer which is provided between the first and second substrates on the second substrate side and which includes a coloring material that changes in color due to electrochemical oxidation or reduction, and a third layer between the first and second layers. The third layer is an electrolytic layer having non-transmissivity or transmission retardancy against the light emissive material or its oxidation or reduction species.

21 Claims, 4 Drawing Sheets

DISPLAY DEVICE

CROSS-REFERENCE TO RELATED APPLICATION

This application is based upon and claims the benefit of priority from the prior Japanese Patent Application No. 2004-301402, filed on Oct. 15, 2004, the entire contents of which are incorporated herein by reference.

BACKGROUND OF THE INVENTION

1. Field of the Invention

The present invention relates generally to display devices using a material that exhibits electrogenerated chemiluminescence, also known as electrochemiluminescence (ECL), and a material exhibiting electrochromic (EC) phenomena.

2. Related Art

Half-transmissive liquid crystal display (LCD) devices offer both reflective displaying capability and light-emitting displaying capability, and are thus widely used as display panels of indoor/outdoor-use handheld electronic equipment, such as mobile cellular phones. Prior known half-transmissive LCD panels are designed so that a reflector layer with a convexo-concave surface is provided at part of a picture element or "pixel" for performing reflective display operations while a transmissive display unit is provided at the remaining area, and a backlight placed beneath this transmissive display unit, thereby to perform light-emitting display operations. One of the LCDs is disclosed, for example, in Published Japanese Patent Application No. 2003-241188, at pp. 3–5 and in FIG. 3 thereof.

In the case of such display panel, regarding the light-emitting display, a sufficiently bright and readily viewable display is achievable depending upon the brightness or luminosity of the backlight. Unfortunately, as for the reflective display, the display panel fails to offer eye-friendly display performances with enough contrast properties. This reason can be said because it suffers from limitations based on LCD's display principles, such as the use of a polarizer plate(s). Another reason is that each pixel is subdivided into two areas, one of which is exclusively used for reflective display, and the other of which is for light emission display, resulting in a decrease in effective display area.

Another approach to achieving a display device capable of performing high-contrast reflective display operations is to employ an electrochromic display (ECD) panel. The display device of this type is structured to have a pair of spaced-apart electrodes, between which disposed are an electrochromic (EC) material that is changeable in color due to electrochemical oxidation or reduction and an electrolyte. An example of it is found in Published Japanese Patent Application No. 2003-21848, at pp. 4–14, in FIG. 1. However, this ECD panel has the reflective displaying capability only, so its on-screen display images are difficult to be seen at dark places.

To ameliorate this problem, a display device capable of performing at a single pixel both the reflective and light-emitting display operations has been proposed, such as disclosed in Japanese patent application No. 2003-360535.

The reflective/light-emitting displayable panel as taught thereby is such that a reflective display operation is carried out by use of electrochromic (EC) phenomena with color changeability due to electrochemical oxidation and reduction or "redox," whereas a light-emitting display operation is carried out by use of electrochemiluminescence (ECL) phenomena—that is, light emission takes place in the process of deactivation of an excited state created due to encounter or collision of ionic radicals, which have been created by electrochemical redox.

Figure 5:
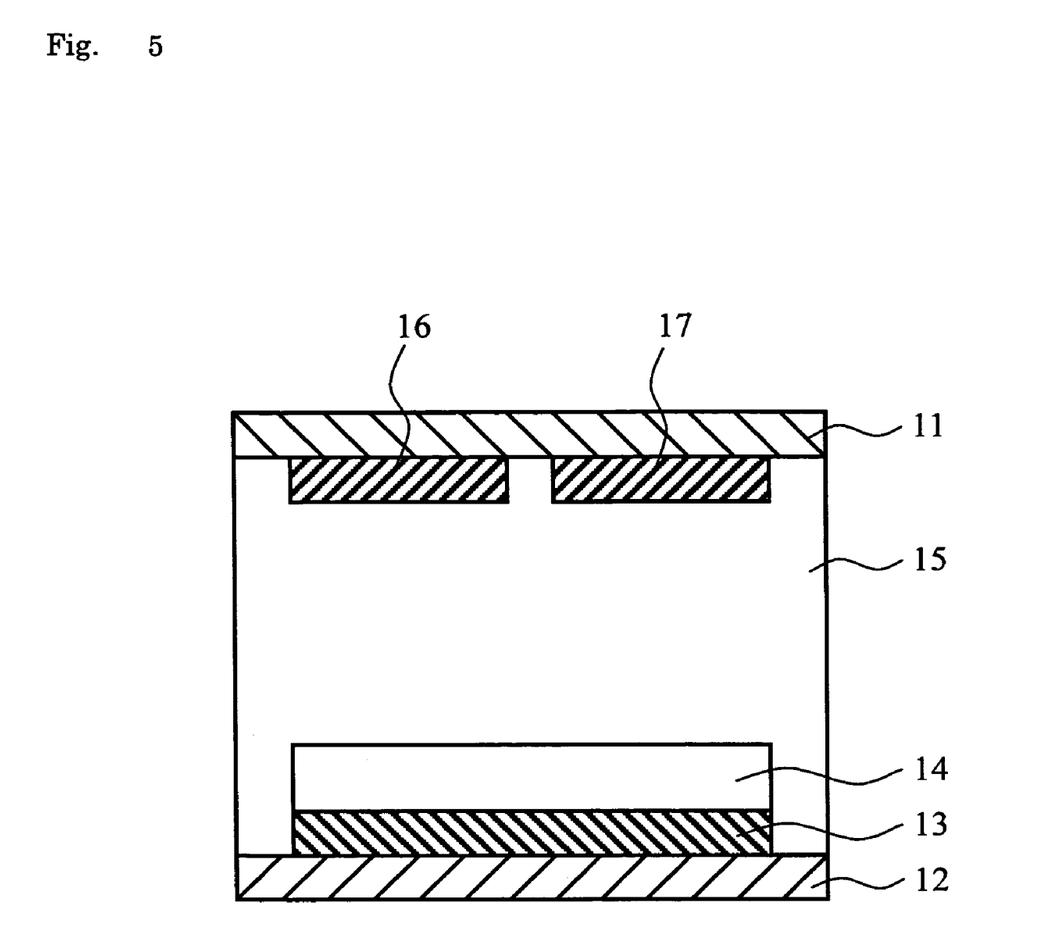
FIG. 5 is a sectional view of a display device.

See FIG. 5, which illustrates in cross-section a display device of the type stated above. As shown herein, the display device includes a first substrate 11, a pair of first and second electrodes 16 and 17 which are provided on the first substrate 11, a second substrate 12 that is provided to be spaced apart from and oppose the first substrate 11, and a third electrode 13 provided on the second substrate 12 side. In addition, a second layer 14 is provided between the first and second substrate 11–12 at a location near the second substrate 12. The second layer 14 contains therein an EC material with color changeability due to electrochemical oxidation or reduction. Provided on the first substrate 11 side between the first and second substrates 11–12 is a first layer 15 which is made of an electrolytic material, in which is contained an ECL material that emits light through electrochemical oxidation or reduction. One set of the first to third electrodes 16–17 and 13 makes up a single pixel.

As the ECL material is contained in the first layer 15 (referred to as "ECL layer" hereinafter), when a voltage is applied thereto, this material is oxidized at part in close proximity to the electrode, resulting in creation of cation radicals (oxidation species); when this material is reduced, anion radicals (reduction species) are produced therein. Upon association of these cations and anions, an excited state of the ECL material takes place to emit light during its deactivation process. Using this phenomenon, light-emitting displaying is carried out.

Also note that as the EC material is contained in the second layer 14 (referred to hereinafter as "EC layer"), electrochemical oxidation or reduction occurs upon application of a voltage thereto. This results in a change in color, such as either color generation or color disappearance. Using this phenomenon, reflective display is performed.

When being instructed to perform the light-emitting display, an alternate current (AC) voltage is applied between the first and second electrodes 16–17. Alternatively, when being instructed to perform the reflective display, a direct current (DC) voltage is applied between the third electrode 13, and the first and second electrodes 16–17. The display device is used switching between these light-emitting and reflective display modes when the need arises.

It has been revealed that the display device having such the cell structure suffers from a problem: the ECL layer (i.e., first layer 15) decreases in efficiency of the ECL phenomenon. One cause of such reduction of ECL efficiency is that cation and anion radicals as created on or above the electrode(s) badly behave to diffuse or spread, resulting in deactivation prior to the association of these radicals.

One known approach to avoiding this problem is to employ a device structure which is designed to shorten the distance between the first and second electrodes 16–17 and the second layer 14, thereby lessening the volume in which the produced cation and anion radicals are spreadable. Unfortunately, this approach does not come without accompanying a penalty which follows. Highly reactive radical ECL molecules are made easier, by such spread, to reach the EC layer (second layer 14) and then come into contact with the EC layer, resulting in generation of secondary reactions, known as side reactions. This can deteriorate the EC layer in case the display device is used for an extended length of time period.

BRIEF SUMMARY OF THE INVENTION

An object of this invention is to provide a display device capable of performing both reflective display and light-emitting display operations, which device enables improving the light-emitting display characteristics and also lengthening the lifetime of reflective display characteristics.

In accordance with a first aspect of this invention, a display device includes a first substrate, first and second electrodes provided on the first substrate, a second substrate provided apart from said first substrate so as to make a space therebetween, and a third electrode provided on said second substrate, opposing to said first and second electrodes. The display device also includes a first layer which is provided in the space at a location adjacent to said first and second electrodes and which contains therein a light emissive material that emits light through electrochemical oxidation or reduction, and a second layer which is provided in the space at a location adjacent to said third electrode and which contains a coloring material with color changeability through electrochemical oxidation or reduction. The device further includes a third layer provided between the first and second layers and made of an electrolytic material having non-transmissivity or transmission retardancy against either light emissive material molecules or oxidation/reduction species of the light emissive material.

In accordance with a second aspect of the invention, a display device includes a first substrate, first and second electrodes provided on the first substrate, a second substrate provided apart from said first substrate so as to make a space therebetween, and a third electrode provided on said second substrate, opposing to said first and second electrodes. The display device also includes a first layer which is provided in the space at a location adjacent to said first and second electrodes and which contains therein a light emissive material that emits light through electrochemical oxidation or reduction, and a second layer which is provided in the space at a location adjacent to said third electrode and which contains a coloring material with color changeability through electrochemical oxidation or reduction. A third layer is provided between the first and second layers and made of an electrolytic material containing therein a cross-link polymer.

In accordance with a third aspect of the invention, a display device includes a first substrate, first and second electrodes provided on the first substrate, a second substrate provided apart from said first substrate so as to make a space therebetween, and a third electrode provided on said second substrate, opposing to said first and second electrodes. The display device also includes a first layer which is provided in the space at a location adjacent to said first and second electrodes and which contains therein a light emissive material that emits light through electrochemical oxidation or reduction, and a second layer which is provided in the space at a location adjacent to said third electrode and which contains a coloring material with color changeability through electrochemical oxidation or reduction. A third layer is provided between the first and second layers and is made of an electrolytic material with a support salt being dispersed in a polyether-based polymer.

According to the invention, in display devices of the type enabling both reflective display and light-emitting display, it is possible to improve the light emission display properties while lengthening the reflective display lifetime.

DETAILED DESCRIPTION OF THE INVENTION

Display devices in accordance with embodiments of the invention will be explained in detail below.

Figure 1:
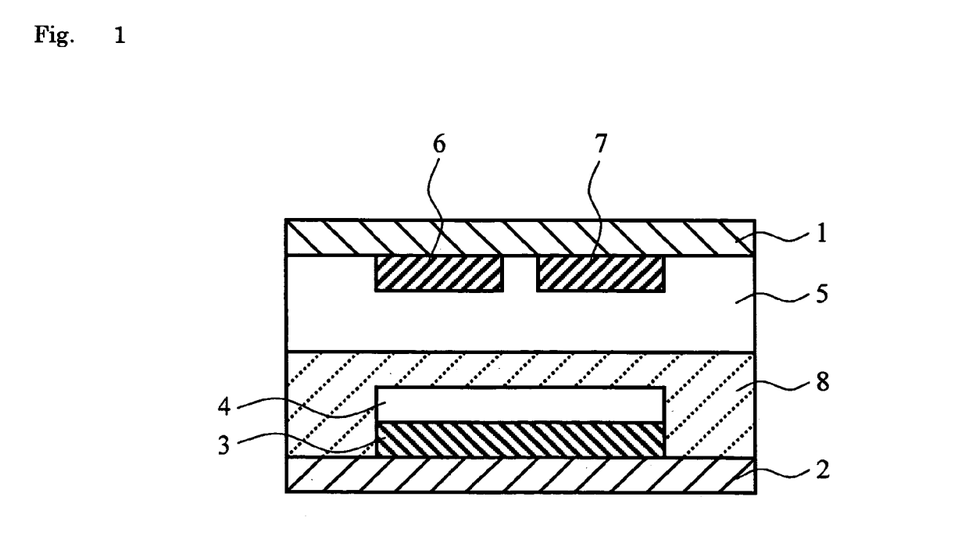
FIG. 1 is a diagram illustrating, in cross-section, a cell structure of a display device in accordance with a first embodiment of the present invention.
Figure 2:
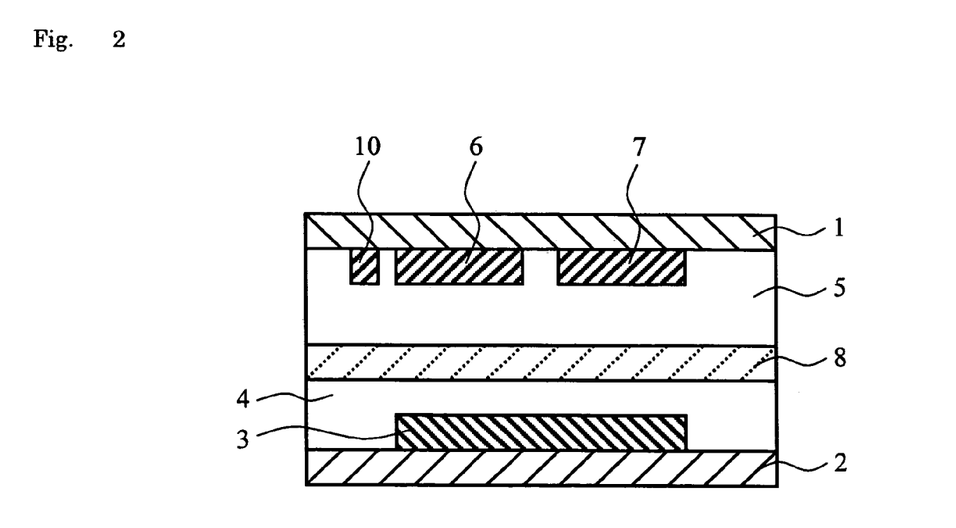
FIG. 2 is a cross-sectional diagram of a cell structure of a display device in accordance with a second embodiment of this invention.

A flat-panel display device embodying the invention is depicted in cross-section in FIGS. 1 and 2. In FIGS. 1–2, the display device has a first substrate 1, a pair of first and second electrodes 6 and 7 which are provided on the first substrate 1, a second substrate 2 which is provided to be spaced apart from and oppose the first substrate 1, and a third electrode 3 that is provided on the second substrate 2.

A first layer 5 is provided between the first and second substrates 1–2 at a location adjacent to the first substrate 1, that is, on the first substrate side. This layer 5 contains therein a light emissive material which produces light through electrochemical oxidation or reduction. A second layer 4 is provided between the first and second substrates 1–2 on the second substrate side. This layer 4 contains a coloring material that changes in color due to electrochemical oxidation or reduction.

Furthermore, a third layer 8 that is an electrolytic layer is provided between the second layer 4 and first layer 5. The third layer 8 is a layer of the type having non-transmissivity or transmission retardancy with respect to molecules of the light emissive material per se and also against oxidation species (cation radicals) or reduction species (anion radicals) of the light emissive material.

That is, the display device comprises a pair of spaced-apart first and second substrates having inside-facing surfaces; a couple of laterally adjacent first and second electrodes on the surface of the first substrate; the third electrode on the surface of the second substrate; the first layer overlying said first and second electrodes on said first substrate; the second layer on or above the surface of said second substrate to cover said third electrode; and the third layer interposed between the first and second layers.

One set of the first electrode 6, second electrode 7 and third electrode 3 constitutes a single picture element or "pixel." The first and second electrodes 6–7 are arranged so that these are substantially the same in size as each other. The third electrode 3 is patterned per pixel.

The first layer 5 contains a light emissive material that delivers light upon deactivation of the material being excited by generation of electrochemical oxidation or reduction due to application of a voltage-that is, a material which exhibits electrochemiluminescence (ECL).

In the first layer 5, the ECL material is oxidized in vicinity of the electrode resulting in creation of oxidation species, i.e., cation radicals; upon reduction, the ECL material is electrochemically reduced resulting in creation of reduction species, i.e., anion radicals. These cations and anions are associated together, resulting in generation of an excited state of the ECL material. In its deactivation process, light is emitted. By use of this phenomenon, light-emitting display is performed. In the first layer 5, it is desirable that a support salt be present along with the ECL material to thereby facilitate execution of the oxidation and reduction of the ECL material.

The second layer 4 is designed to contain a coloring material which is changeable in color upon occurrence of electrochemical oxidation or reduction due to voltage application—in other words, a material that exhibits electrochromic (EC) phenomenon.

In the second layer 4, a color change phenomenon takes place in a way such that coloring or color disappearance occurs due to reduction of the EC material, while color disappearance or coloring occurs due to oxidation. An example is that when using $WO_3$, it looses its color due to oxidation reactions to thereby become optically transparent, and is colored in blue due to reduction reactions. This phenomenon is utilized to perform a reflective display operation.

This display device is designed for example to have a display mode changeover switch for enabling selective instruction as to which one of the light-emitting display or the reflective display is to be performed. An operator or user may select and instruct either one of the display modes in a way pursuant to in-use environments. Driver circuitry is provided, which is operatively responsive to receipt of such instruction information of this switch, for supplying a prespecified voltage(s) to the first to third electrodes so that a selected display is carried out. For example, in case the light-emitting display is instructed, an AC voltage is applied between the first and second electrodes. When the reflective display is instructed, the third electrode is controlled in voltage potential.

It should be noted that in FIG. 1, the third electrode 3 of second substrate 2 and its overlying second layer 4 are patterned in units of pixels. In FIG. 2, the third electrode 3 of second substrate 2 is patterned per pixel, while its overlying second layer 4 is not patterned per pixel but designed as a common layer to a plurality of pixels. Any one of the designs is employable on a case-by-case basis.

Also note that unlike the cell structure of FIG. 1 with no reference electrodes, the cell of FIG. 2 includes a reference electrode 10 on an inside surface of the first substrate 1. This reference electrode may also be provided in the structure of FIG. 1 when the need arises. The reference electrode 10 may be provided on a per-pixel basis as shown in FIG. 2 or, alternatively, provided in the display device at one or a plurality of locations. Any one of the designs of FIGS. 1–2 is employable.

In the illustrative embodiment, the second layer 4 is designed as a solid layer whereas the first layer 5 is either a solid layer or a liquid layer. Arranging both the second layer 4 and the first layer 5 as solid layers is desirable in terms of suppression of performance degradation otherwise occurring due to fluid leakage and/or solvent vaporization.

A method for electrically driving the reference electrode-including display device in accordance with the embodiment is as follows. Firstly, when performing a reflective display operation, a voltage is applied to the third electrode 3 so that it has a potential at which the EC material is electrochemically reduced or alternatively at a potential whereat this material is oxidized. While letting the first electrode 6 and second electrode 7 be set at the same potential level, perform inversion in polarity of the voltage being applied between the first and second electrodes 6–7 and the third electrode 3.

An example of the EC material of second layer 4 used here is a material that looses its color due to oxidation and gets colored by reduction.

Figure 3:
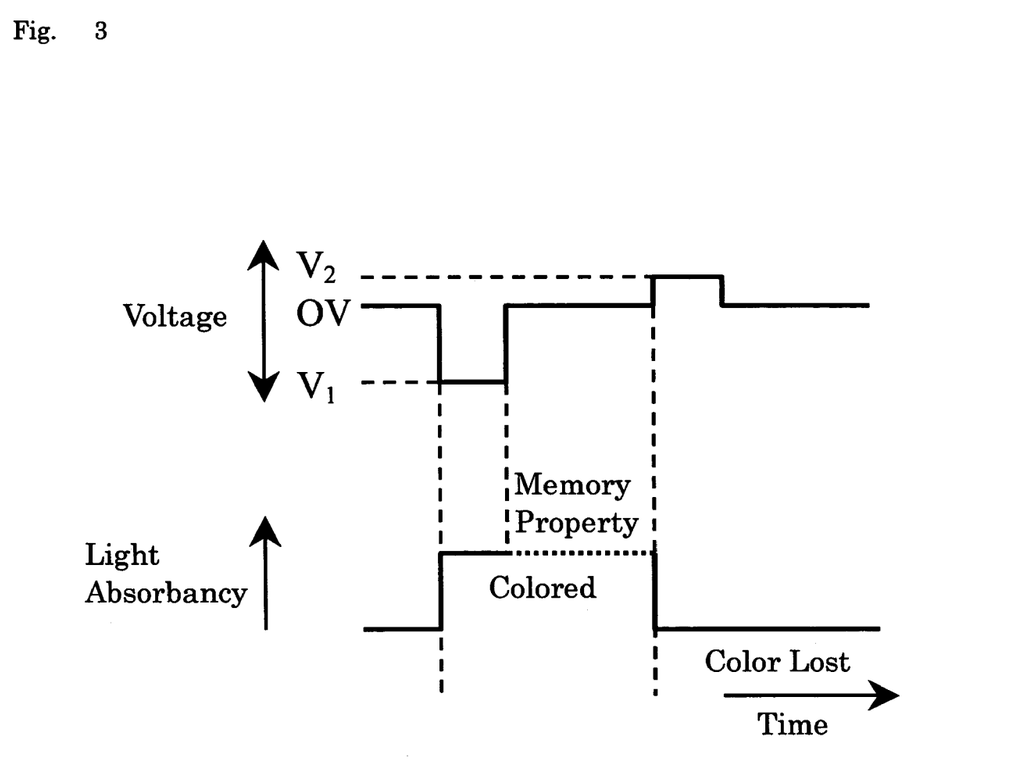
FIG. 3 is a diagram for explanation of a reflective display operation of the embodiment of the invention.

See FIG. 3, which shows an example of a change in voltage potential of the third electrode 3 along with the colored and color-disappeared states of the second layer 4 on such occasion. As shown in FIG. 3, when the potential of third electrode 3 is designed so that it stays at a potential $V_1$ ($V_1$ is the EC material's reduction potential of a negative value) within a predetermined length of time period $\Delta t$, the EC material in the EC layer 4 is reduced, resulting in light emission (light absorbancy is relatively large). After the elapse of a certain length of time, set the potential of the third electrode 3 at zero volts (0V). Even in this event, the colored state is continuously established because the EC material inherently has a memory property. To let it loose the color, apply a voltage $V_2$ ($V_2$ is the EC material's oxidation potential of a positive value) to the third electrode 3. Then, the EC material is oxidized, resulting in disappearance of the color (the light absorbancy is less).

In the case of using the reference electrode 10, the potential of the third electrode 3 for color generation and color disappearance may be set as a potential with respect to the reference electrode 10.

Depending upon EC material to be used, the support salt that is contained in the first layer 5 and/or the third layer 8 is dissociated resulting in creation of radical ions, which become involved with the EC (oxidation/reduction) reactions of this reflective display. For example, in case the EC layer 4 is made of $WO_3$, certain material is used which contains positive lithium ions $Li^+$ in the ECL material-containing first layer 5 or in the third layer 8 (the support salt is lithium trifluoromethanesulfonate ($LiCF_3SO_3$) or else, for example). In this case, EC reaction takes place in a way defined in Equation (1) below:

$$WO_3 + xe^- + xLi^+ \Longleftrightarrow Li_xWO_3. \tag{1}$$

In the oxidation reaction (left-side term of Equation (1)), color disappearance occurs (optically transparent); in the reduction reaction (right-side term of Eq. (1)), color change occurs (colored in blue).

Figure 4:
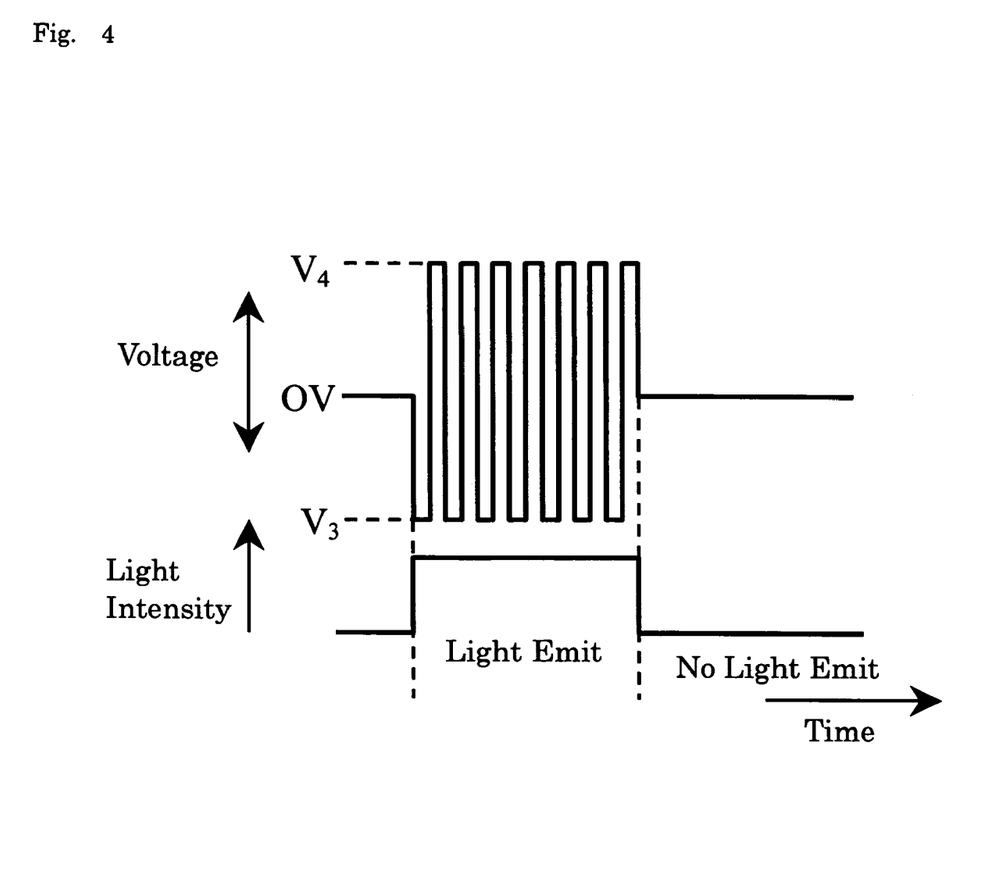
FIG. 4 is a diagram for explanation of a light-emitting display operation of the embodiment of the invention.

Next, when performing a light-emitting display operation, no voltage is applied to the third electrode 3. Instead, an AC voltage is applied between the first electrode 6 and the second electrode 7. See FIG. 4. This diagram shows the voltage being applied to the reference electrode 10 of first electrode 6 along with exemplary light emission and no light emission states of the first layer (ECL layer) 5 at that time. Although not specifically depicted in FIG. 4, the voltage of the second electrode 7 relative to its associated reference electrode is designed to have a potential which is opposite in polarity to that of the first electrode 6 within a time period of the light emission state. As shown in FIG. 4, the first electrode 6 is electrically driven so that its potential alternately becomes $V_3$ ($V_3$ is a reduction potential of a negative value at which the EC material produces anion radicals) and $V_4$ ($V_4$ is an oxidation potential of a positive value whereat the EC material yields cation radicals). A voltage with its polarity opposite thereto is applied to the second electrode 7. With such voltage application, anion radicals and cation radicals of the ECL material are alternately produced at these electrodes 6–7. Upon association of these radical ions, an excited state of the ECL material generates, resulting in light emission in the process of its deactivation. When these voltages are not applied, the result is establishment of a non-emission state. The AC drive voltage may be designed to have a frequency of about several tens of hertz (Hz).

According to this embodiment, it becomes possible by switching between the reflective display and the light-emitting display to permit a single display device to operate selectively in two different display modes. In addition, using the electrolyte in common to both the reflective display and light-emitting display makes it possible to eliminate unwanted size increase of the display device otherwise occurring due to the overlap layout of a reflective display cell and a light-emitting display cell. Furthermore, it is possible to effectively utilize the individual pixel area. This can be said because the embodiment does not employ any schemes for bisecting each pixel into portions, one of which is exclusively used for the reflective display, and the other of which is for the light-emitting display.

An operation of the third layer 8 will be set forth below. As the third layer 8 is an electrolytic layer, there are retained the migration and supply of those ions or electrical charge carriers required for reactions of the EC material in the EC layer. Also importantly, this layer is typically made of a specific material having its nature that prevents or renders difficult the transmission of ECL molecules or their anion radicals or cation radicals, wherein the former is known as non-transmissivity whereas the latter is called transmission retardancy. Owing to such nature, it is possible to suppress side reactions occurrable when ECL molecules that became anion radicals or cation radicals in the ECL layer during light emission come into contact with the EC layer. This makes it possible to prevent or at least greatly reduce deterioration of the EC layer.

Note here that a distance between the first and second electrodes 6–7 and the third layer 8 is set as shorter as possible. This is desirable because shortening the distance makes it possible to suppress unwanted diffusion of anion or cation radicals as yielded in the ECL layer, thereby to restrain a decrease in light emission efficiency. The distance may preferably be set to 2 μm or less. Such short distance design is realizable by the presence of the third layer 8 which acts to preclude contact of ECL molecules with the EC layer.

A detailed explanation will next be given of respective structural features for use in the display devices embodying the invention as shown in FIGS. 1 and 2.

The first substrate 1 may typically be an optically transparent plate made of either glass or plastic material including, but not limited to, PET, PEN, PES, and PC. In case a front surface of the first substrate 1 is used as a viewing face of the display device, the first substrate 1 is preferably made of a material that is less in light absorption in the visible light region.

The first and second electrodes 6–7 provided on the first substrate 1 are each designed as a transparent electrode made typically of a metal oxide semiconductor. Examples of it are transition metal oxides, such as for example oxides of titanium (Ti), zirconium (Zr), hafnium (Hf), strontium (Sr), zinc (Zn), tin (Sn), indium (In), yttrium (Y), lanthanum (La), vanadium (V), niobium (Nb), tantalum (Ta), chromium (Cr), molybdenum (Mo) and tungsten (W), perovskite such as $SrTiO_3$, $CaTiO_3$, $BaTiO_3$, $MgTiO_3$ and $SrNb_2O_6$ or composite oxides or oxide admixtures thereof, such as GaN or else. Alternatively, in case the first substrate side is designed to be on the opposite side to the viewing face, a reflective electrode is used, which may be made of aluminum (Al), silver (Ag) or equivalents thereto.

As for size dimensions, it is preferable that the first and second electrodes 6 and 7 are as large as possible in order to increase cell aperture ratios. Also preferably, these electrodes 6–7 are the same as each other in material and in size.

The second substrate 2 may be designed to use the same material as that of the first substrate 1. In case the viewing face is set on the second substrate 2 side, the second substrate 2 is preferably made of a material less in absorption in the visible light region.

The third electrode 3 that is provided on the second substrate 2 is the same in material as the first and second electrodes 6–7 and is preferably designed to have a larger size in order to increase the aperture ratios. Also preferably, the third electrode 3 is provided to spatially oppose the first and second electrodes 6–7.

The EC material-containing second layer 4 is provided on the third electrode 3. Examples of the EC material include, but not limited to, inorganic substances such as $MnO_2$, $CoOOH$, $NiOOH$, $CuO$, $RuO_2$, $Ph_2O_3$, $IrO_x$, prussian blue, $WO_3$, $MoO_3$, $TiO_2$, $V_2O_5$, $Nb_2O_5$, AgI or the like, low molecular organic compositions such as viologen-based organic material, orthochloranil, 4-benzoylpyridium derivatives, ruthenium-tris-ruthenium-bis-osmium-tris, osmium-bis type transition metal complex, multinuclear complex, ruthenium-cis-diaqua-bipyridyl, phthalocyanine dye, naphthalocyanine dye, porphyrin dye, perylene dye, anthraquinone pigment, azoic dye, quiophthalon dye, naphthoquinone dye, cyanine dye, merocyanine dye, diphthalocyanine complex, 2,4,5,7-tetranitro-9-fluorene, 2,4,7-trinitro-9-fluorenylidenemalononitrile, tetracyanoquinodimethane and others, electrically conductive high polymers such as polypyrrole derivatives, polythiophene derivatives, polyaniline derivatives, polyazulene derivatives, polyisothianaphthene, poly(N-methylisoindole), poly(dithieno[3,4-b:3',4'-d]thiophene), polydiallylamine derivatives, polypyrrolopyrrole derivatives, Ru complex-based conductive polymer and equivalents thereof.

In case the second layer 4 is made of inorganic material, film formation is done by any one of vapor deposition, sputter, gas-phase growth and sol-gel processes and/or microparticle sintering methods. Alternatively in the case of using low molecular organic material, deposition or coating/dehydration (after liquidation) is carried out. For the conductive polymers, coating and dehydration (after liquidation) are done, followed by electrolytic polymerization. By use of these processes, the intended solid layer or membrane is obtainable.

The ECL material-containing first layer 5 is provided between the first substrate 1 with the first and second electrodes 6–7 formed thereon and the second substrate 2 with the third electrode 3 and second layer 4 being stacked or multilayered thereon.

Some major examples of the ECL material are polycyclic aromatic compounds such as naphthacene derivatives (rubrene, 5,12-diphenylnaphthacene), anthracene derivatives (9,10-diphenylanthracene), pentacene derivatives (6,10-diphenylpentacene), perifuranthene derivatives (dibenzotetra(methylphenyl)perifuranthene) or the like, n electron-conjugate polymers such as polyparaphenylenevinylene derivatives, polythiophene derivatives, polyparaphenylene derivatives, polyfluorene derivatives and others, hetero aromatic compounds such as coumarin or else, chelate metal complexes such as $Ru(bpy)_{32}$- or else, organic metal compounds such as tris(2-phenylpyridine)iridium or else, and chelate lanthanoid complexes.

The first layer 5 is desirably arranged to contain therein a support salt(s) for facilitating generation of oxidation/reduction reactions of the ECL material. In this case, in order to permit dissociation of such support salt in ions, the layer 5 is preferably designed to contain also a solvent (for the liquid electrolyte use) or a gelled polymer as swelled with this solvent (for the solid electrolyte use).

Typical examples of this support salt are tetrabutylammonium perchlorate, Potassium Hexafluorophosphate, trifluoromethane lithium sulfonate, lithium perchlorate, tetrafluoro boric acid tetra-n-butylammonium, tripropyl amine, tetra-n-butylammonium fluoroborate and others.

Additionally, example of the above-noted solvent include acetonitrile, N,N-dimethylformamide, propylenecarbonate, o-dichlorobenzene, glycerin, water, ethyl alcohol, propyl alcohol, dimethylcarbonate, ethylenecarbonate, Y-butyrolactone, NMP, 2-methyltetrahydrofuran, toluene, tetrahydrofuran, benzonitrile, cyclohexane, normal hexane, acetone, nitrobenzene, 1,3-dioxolane, furan, and benzotrifluoride.

Examples of the gelled polymer are polyacrylnitrile (PAN), copolymer of vinylidene fluoride (VDF) and 6-fluoropropylene (HFP), polyethylene oxide (PEO) and equivalents thereto.

When letting the first layer 5 be a liquid layer, the above-stated solvent is employable in a way such that the support salt and ECL material are dissolved therein, followed by injection into a space between the first substrate 1 with the first and second electrodes 6–7 formed thereon and the second substrate 2 with the third electrode 3 and second layer 4 plus third layer 8 stacked thereon. Alternatively, in case the first layer 5 is made up of a solid layer, a support-salt/solvent-containing gelled polymeric solution (solvent-rich) may be formed by coating and dehydration techniques.

Then formed on the second layer 4 is the third layer 8, which may be an electrolytic layer or membrane that exhibits non-transmissivity or transmission retardancy against ECL material molecules and/or cation radicals or anion radicals of the ECL material stated supra.

In the third layer 8, alkali metals or alkaline earth metal salts or protonic acids are employable for use as a carrier(s). Examples of negative ions are $SCN^-$, $Cl^-$, $Br^-$, $I^-$, $BF_4^-$, $PF_6^-$, $CF_3SO_3^-$, $SbF_6^-$, $AsF_6^-$, $ClO_4^-$, $B(C_6H_5)_4^-$ and others. Exemplary positive ions are alkali metal cations such as $Li^+$, $Na^+$, $K^+$, etc. and organic cations such as $(C_4H_9)_4N^+$, $(C_2H_5)_4N^+$ or else. In particular, letting lithium ions be contained therein is desirable in order to improve the mobility of charge carriers.

Two major examples of the electrolytic layer making up the third layer 8 are indicated in Sections 1) and 2) below.

1) Cross-linking Polymer-Containing Electrolyte Layer

A cross-linking or "bridging" polymer is the one that was obtained by forcing linear-structured polymer molecules to chemically bond together into a reticulate or "mesh" structure. Such bridge polymer has a three-dimensional (3D) mesh-like dense structure, which is low in solubility relative to the solvent and yet high in mechanical strength. In addition, due to the dense structure, the polymer has its nature that rarely allows ECL material molecules and ECL material's cation radicals or anion radicals to readily pass through it—that is, the polymer has molecule/ion penetration retardancy.

An approach to permitting the bridge polymer-containing layer to function as the electrolyte layer is to employ a layer which is designed to use the bridge polymer as a matrix with a support salt, such as an alkali metal or alkaline earth metal salt or protonic acid, being dispersed therein. Another approach is to use a layer comprised of a bridge polymer with an ionic dissociation group(s) being introduced thereinto.

Examples of the support salt dispersed in the bridge polymer are lithium fluoride (LiF), sodium iodide (NaI), lithium iodide (LiI), lithium perchlorate ($LiClO_4$), sodium thiocyanate (NaSCN), trifluoromethane lithium sulfonate ($LiCF_3SO_3$), sodium fluoroborate ($LiBF_4$), hexafluorinated lithium phosphate ($LiPF_6$), phosphoric acid ($H_3PO_3$), sulfuric acid ($H_2SO_4$), trifluorinated methanesulfonic acid, tetrafluorinated ethylenephosphoric acid ($(C_2F_4(SO_3H)_2)$), hexafluorinated butanephosphoric acid ($(C_4F_6(SO_3H)_4)$), lithium chloride (LiCl), lithium bromide (LiBr) and others.

An example of the interlinking or bridging polymer is at least one kind of material as selected from the group to be described below, with a functional core element (i.e., atom or atom group) for contribution to cross-link reactions being introduced thereinto for interlink. The group consists essentially of polyethers such as polyethylene oxide (PEO), polypropylene oxide or polybutylene oxide, polycarbonates such as polyethylene carbonate or polypropylene carbonate, fluorine-based resin materials such as polyvinylidene fluoride or polytetrafluoroethylene, polysiloxane such as polydimethylsiloxane or else and polysiloxane derivatives, polyesters such as poly-β-propiolactone, polypeptides such as polyglutamate, polymers such as polyphosphazene, polyvinylpyridine, polyacrylonitrile, acrylate-based resin, polyethyleneimine, polyethylene sulfide or the like and derivatives thereof. Typical examples of the functional group contributive to crosslink or "bridging" reactions are a cinnamoyl group and isocyanate group. Examples of a method for introducing into the polymer the crosslink reaction-contributing functional group are esterification reactions, urethanization reactions, ureaconversion reactions, and from-the-epoxy addition reactions, although not specifically limited thereto.

More preferably, the bridge polymer-containing electrolytic layer may be a layer comprised of a polymer with a polystyrene-divinylbenzene copolymer as its basic or "bone" structure and also with a sulfonic acid group ($—SO_3^-M^+$, where $M^+$ is an alkali metal ion) introduced thereinto. When using this copolymer, a need is felt to supply those ions required for oxidation and reduction (redox) of the EC layer while forming ion pairs by sulfonic acid ions and positive ions. The ratio of divinylbenzene to styrene is preferably set so that 20 percent by weight or less of divinylbenzene is contained therein—more preferably, 15 weight percent (wt %) or below. A lower limit value is preferably set to 15 wt % or greater; more preferably, 10 wt % or more.

2) Electrolyte Layer with Support Salt Dispersed in Polyether-Based Polymer

A polyether-based polymer is such that positive ions being supplied from the support salt behave to coordinate with oxygen atoms of the polymer. Upon voltage application thereto, ions experience coordination with their nearby oxygen ions and move toward the EC layer to thereby supply the ions necessary for redox of the EC layer. Additionally the polyether polymer of a dense structure has its nature which rarely permits smooth pass-through of ECL material molecules and cation radicals or anion radicals of the ECL material.

Some major examples of the polyethers are polyethylene oxides, polypropylene oxides, and polybutylene oxides. In particular, the use of polyethylene oxides, such as orthodichlorobenzene or dimethoxyethane, is preferable for the reasons which follow. These are less soluble in solvents and are hardly decomposable even when coming into contact with a liquid ECL layer and thus are chemically stable. Moreover, the polyethylene oxides are high in density so that it is possible to prevent immersion or "invasion" of ECL molecules and cation/anion radicals of the ECL material.

Typical examples of the support salt as dispersed in the polyether-based polymer are lithium fluoride (LiF), sodium iodide (NaI), lithium iodide (LiI), lithium perchlorate (LiClO$_4$), sodium thiocyanate (NaSCN), trifluoromethane lithium sulfonate (LiCF$_3$SO$_3$), sodium fluoroborate (LiBF$_4$), hexafluorinated lithium phosphate (LiPF$_6$), phosphoric acid (H$_3$PO$_3$), sulfuric acid (H$_2$SO$_4$), trifluorinated methanesulfonic acid, tetrafluorinated ethylenephosphoric acid (C$_2$F$_4$(SO$_3$H)$_2$), hexa-fluorinated butanephosphoric acid (C$_4$F$_6$(SO$_3$H)$_4$), lithium chloride (LiCl), lithium bromide (LiBr) and others.

Furthermore, in the third layer 8, it is desirable that any one of the interlink or bridge polymer (and its support salt) discussed at Section 1) and the polyether-based polymer and its support salt stated in Section 2) is impregnated in a nonwoven fabric, since this design makes it possible to further increase the density of the third layer 8, which in turn makes it possible to more effectively prevent the invasion of ECL material molecules and cation/anion radicals of the ECL material.

Examples of the nonwoven fabric are polyethylene, polypropylene, acrylic, polyethylene terephthalate, polyester, rayon and nylon. In particular, a nonwoven fabric made of polyethylene or polypropylene is preferable for practical implementation because such fabric is of increased handleability.

EXAMPLES

Some examples will be explained below.

Example 1

A square flat display panel with each side of 2.5 inches was prepared in a way which follows. Note here that each pixel was designed to consist of a mono-color electrochemical reactive element having its structure such as shown in FIG. 2. The display panel was formed so that a single pixel measures 100 μm in each side.

Firstly, a glass substrate having a thickness of 1.1 mm was used as the first substrate 1. A thin film of indium tin oxide (ITO) was then formed on the glass substrate by sputter techniques to a thickness of 100 nanometers (nm). Then, the ITO film was patterned, thus forming the first and second electrodes 6–7. An Ag film was formed by sputtering to a thickness of 100 nm, followed by patterning to thereby provide the reference electrode 10 of FIG. 2.

A glass substrate was used as the second substrate 2. An ITO film was formed thereon to a thickness of 100 nm and then patterned to form the third electrode 3. The second substrate 2 with the third electrode 3 formed thereon is then subjected at its surface to ultraviolet (UV) ray exposure. Then, 4 moles per litter (as tungsten) of pre-synthesized polytungsten acid peroxide water solution was spin-coated to thereby form an EC layer (WO$_3$ film) with a thickness of about 100 nm.

Next, the third layer 8 was formed in a way which follows.

Let 10 grams of poly ethyleneoxide-polypropyleneoxide (PEO-PPO) block copolymer triol and 0.60 g of pyridine be dissolved in 300 cc of benzene, followed by dissolution into 20 cc of benzene. Then, 1.03 g of chloride cinnamate was dropped down in an inactive gaseous atmosphere at the room temperature. Let reactions go on for 6 hours, resulting in obtainment of cinnamoyled PEO-PPO with a replacement rate of 95%. The resulting polymer was then dissolved in methylethylketone to achieve 20 weight percent (wt %); here, 0.04 mol of LiCF$_3$SO$_3$ per ionic dissociation group (ethylene oxide and propylene oxide) and a sensitizer made of 5-nitroacenaphthene by 5 mol % with respect to cinnamoyl group are dissolved. This was then coated on the EC layer 4 while using a die coater to control a film thickness of 6 μm. A coated film was dehydrated at 30° C. for 20 minutes. Here, a high-pressure mercury lamp was used to irradiate light rays thereonto for effectuation of crosslink reactions whereby a layer of crosslinkable or "bridgeable" polymer was obtained as the third layer 8 of FIG. 2.

Then, spacer studs or "posts" with a height of 2 μm were formed on the first substrate 1. Next, the substrates were held in place to oppose each other while defining a gap space of 2 μm between the first or second electrode 6, 7 and the third layer 8. Thereafter, an epoxy resin material for use as a sealing adhesive was used to bond together the substrates at their peripheral edges while leaving an injection port(s), resulting in completion of display a cell.

Using 100 mM of LiCF$_3$SO$_3$ as the support salt, let it be dissolved in a DMF (N,N-dimethylformamide) solvent, thereby providing an electrolyte. Then, 8 mM of Ru(bpy)$_3$Cl$_2$ (tris(2,2'-bipyridine)ruthenium(II)chloride) was dissolved as the ECL material in the electrolyte, followed by injection into this cell, resulting in preparation of the ECL layer 5.

Furthermore, the cell structure was bonded to a preformed aluminum (Al) reflector plate, thereby completing the intended display device.

In this cell structure with the first or second electrode 6, 7 and the third layer 8 being spaced apart from each other by a distance of 2 μm, voltage application was done in a way such that the third electrode 3 is potentially positive or negative relative to the reference electrode 10 while letting the first and second electrodes 6–7 be set at the same potential level. This experimentation demonstrated successful achievement of coloring and color-disappearing in an expected manner.

Additionally, an AC voltage was applied between the first and second electrodes 6–7 while applying no voltage to the third electrode 3, resulting in observation of light emission in the color of orange.

Example 2

A display device was formed in a similar way to that of Example 1, except that the third layer 8 and ECL layer 5 were formed in a different way which follows.

Polyethyleneoxide (average molecular weight of 6000) and 0.04 mol of LiCF$_3$SO$_3$ per its ionic dissociation group (ethyleneoxide) were blended in an acetonitrile and then stirred, thus providing a solution. This solution was then coated by a die coater onto the EC layer 4 while controlling its thickness to 6 μm. A coated film was dried at 80° C., thereby preparing the third layer 8.

In addition, for the cell, 5% of poly[9,9-bis(3,6-dioxaheptyl)-fluorene-2,7-diyl] (BDOH—PF) was dissolved in orthodichlorobenzene, followed by injection into this cell. Thus the ECL layer 5 was obtained.

In this cell structure with the first or second electrode 6, 7 and the third layer 8 being spaced apart from each other by a distance of 2 μm, voltage application was done so that the third electrode 3 is positive or negative relative to the reference electrode 10 while letting the first and second electrodes 6–7 be set at the same potential level. This experimentation demonstrated successful achievement of coloring and color-disappearing in an expected manner.

In addition, an AC voltage was applied between the first and second electrodes 6–7 while applying no voltage to the third electrode 3, resulting in observation of light emission in the color of orange.

Example 3

A display device was formed in a similar way to that of Example 2, except that the third layer 8 was prepared in a way which follows.

A 10 μm-thick nonwoven fabric made of polyethylene (PE) was prepared. Then, divinylbenzene and lithium (Li) styrenesulfonate were impregnated in the fabric and then heated for thermal polymerization, resulting in formation of a thin-film of 10 μm thick with a copolymer of sulfonyl group-owning styrene and divinylbenzene being impregnated in the nonwoven fabric. This was cut into a portion having the cell size, which was then put on the EC layer.

In this cell with the first or second electrode 6, 7 and the third layer 8 being spaced apart by a distance of 2 μm, voltage application was done so that the third electrode 3 is positive or negative relative to the reference electrode 10 while setting the first and second electrodes 6–7 to the same potential level. Successful achievement of coloring and color-disappearing was demonstrated.

Additionally, when an AC voltage was applied between the first and second electrodes 6–7, while applying no voltage to the third electrode 3, light emission in the color of orange was observed.

Additional advantages and modifications will readily occur to those skilled in the art to which the invention pertains. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A display device comprising:
    a first substrate;
    first and second electrodes provided on said first substrate;
    a second substrate provided apart from said first substrate so as to make a space therebetween;
    a third electrode provided on said second substrate, opposing to said first and second electrodes;
    a first layer provided in the space at a location adjacent to said first and second electrodes, and containing therein a light emissive material which emits light through any one of electrochemical oxidation and reduction;
    a second layer provided in the space at a location adjacent to said third electrode, and containing a coloring material with color changeability through any one of electrochemical oxidation and reduction; and
    a third layer provided between said first and second layers and made of an electrolytic material having any one of non-transmissivity and transmission retardancy against any one of oxidation and reduction species of said light emissive material.

2. The device according to claim 1, wherein said third layer contains a lithium salt.

3. The device according to claim 1, wherein said first layer is any one of a solid layer and a liquid layer containing said light emissive material and a support salt, and wherein said second layer is a solid layer containing said coloring material.

4. The device according to claim 3, wherein said first and second layers are solid layers.

5. The device according to claim 1, wherein a distance between said third layer and said first and second electrodes is less than or equal to 2 micrometers (μm).

6. A display device comprising:
    a first substrate;
    first and second electrodes provided on said first substrate;
    a second substrate provided apart from said first substrate so as to make a space therebetween;
    a third electrode provided on said second substrate, opposing to said first and second electrodes;
    a first layer provided in the space at a location adjacent to said first and second electrodes, and containing therein a light emissive material which emits light through any one of electrochemical oxidation and reduction;
    a second layer provided in the space at a location adjacent to said third electrode, and containing a coloring material with color changeability through any one of electrochemical oxidation and reduction; and
    a third layer provided between said first and second layers and made of an electrolytic material containing therein a cross-link polymer.

7. The device according to claim 6, wherein said third layer is a layer with a support salt being dispersed in said cross-link polymer.

8. The device according to claim 6, wherein said cross-link polymer making up said third layer is an ionic dissociation group-introduced cross-link polymer.

9. The device according to claim 6, wherein said third layer has a nonwoven fabric with said cross-link polymer being impregnated therein.

10. The device according to claim 6, wherein said cross-link polymer is a styrene-styrenesulfonate copolymer.

11. The device according to claim 6, wherein said third layer contains a lithium salt.

12. The device according to claim 6, wherein said first layer is any one of a solid layer and a liquid layer containing said light emissive material and a support salt whereas said second layer is a solid layer containing said coloring material.

13. The device according to claim 12, wherein said first and second layers are solid layers.

14. The device according to claim 6, wherein a distance between said third layer and said first and second electrodes is less than or equal to 2 micrometers (μm).

15. A display device comprising:
    a first substrate;
    first and second electrodes provided on said first substrate;
    a second substrate provided apart from said first substrate so as to make a space therebetween;
    a third electrode provided on said second substrate, opposing to said first and second electrodes;
    a first layer provided in the space at a location adjacent to said first and second electrodes, and containing therein a light emissive material which emits light through any one of electrochemical oxidation and reduction;
    a second layer provided in the space at a location adjacent to said third electrode, and containing a coloring material with color changeability through any one of electrochemical oxidation and reduction; and
    a third layer provided between the first and second layers and made of an electrolytic material with a support salt being dispersed in a polyether-based polymer.

16. The device according to claim 15, wherein said polyether-based polymer is a polyethylene oxide.

17. The device according to claim 15, wherein said third layer has a nonwoven fabric as impregnated with said support salt and said polyether-based polymer.

18. The device according to claim 15, wherein said third layer contains a lithium salt.

19. The device according to claim 15, wherein said first layer is any one of a solid layer and a liquid layer containing said light emissive material and a support salt, and wherein said second layer is a solid layer containing said coloring material.

20. The device according to claim 19, wherein said first and second layers are solid layers.

21. The device according to claim 15, wherein a distance between said third layer and said first and second electrodes is less than or equal to 2 micrometers ($\mu$m).

* * * * *